July 10, 1945.   R. EKSERGIAN   2,380,159
ENDURANCE TESTING METHOD AND MACHINE,
ESPECIALLY FOR VEHICLE BODY BOLSTERS
Filed Feb. 1, 1943   2 Sheets-Sheet 2

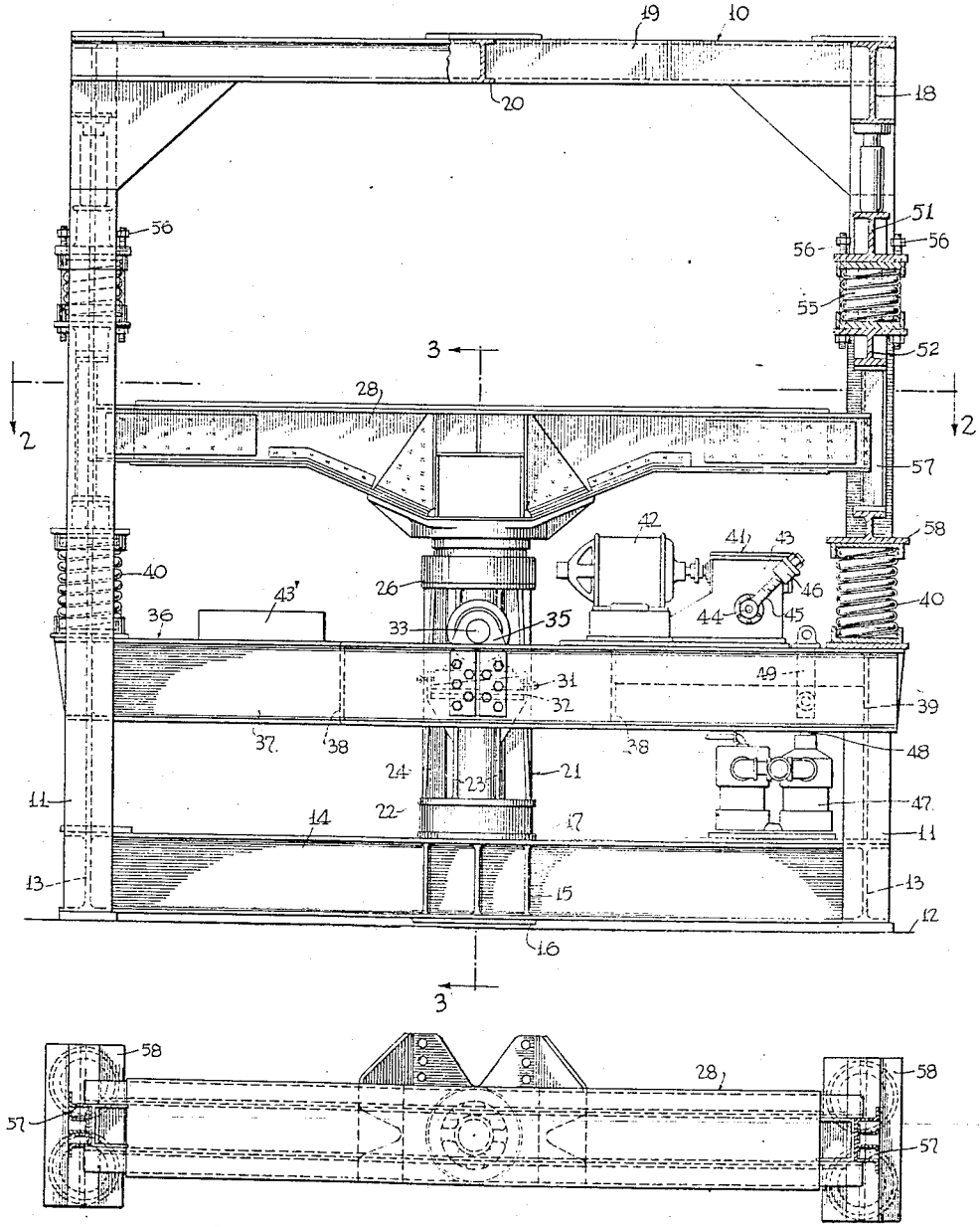

INVENTOR
Rupen Eksergian
BY John P. Tarbert
ATTORNEY

Patented July 10, 1945

2,380,159

UNITED STATES PATENT OFFICE 2,380,159

ENDURANCE TESTING METHOD AND MACHINE, ESPECIALLY FOR VEHICLE BODY BOLSTERS

Rupen Eksergian, Media, Pa., assignor to Edward G. Budd Mfg. Company, Philadelphia, Pa., a corporation of Pennsylvania Application February 1, 1943, Serial No. 474,258

13 Claims. (Cl. 73—100)

The invention refers to an endurance or fatigue testing method and machine particularly for testing beams such as vehicle body bolsters.

Among the objects of the invention is a method and a machine which allows to subject beams, which are supported in a central region, to fluctuating loads in quick succession and over a long period of time.

More specifically, an object of the invention is a method and a machine for subjecting a bolster of a vehicle, especially of a rail car, to the aforesaid endurance tests in such a manner that the loads to which such bolster is subjected in actual use are imitated as closely as possible though condensed into a much shorter period of time, and so that any weaknesses of the construction may be discovered and corrected thereby preventing serious dangers and inconveniences which would arise from breakdowns when a bolster of the tested construction is in actual use on a vehicle.

Another object of the invention is a machine of the aforesaid type which is of simple and rugged construction and which can easily be operated.

To a certain extent, the invention is a further improvement or development of the machine according to Patent No. 2,317,097, issued April 20, 1943, on the copending application Serial No. 350,854, "Fatigue testing machine," Rupen Eksergian, filed August 3, 1940, and reissued under No. 22,416, issued on January 11, 1944.

One feature of the invention consists in supporting a beam to be tested at one point or in one region along its length, in clamping another distant point or region from two sides between elastic cushions such as springs and in subjecting at least one of the springs or the like to vibratory forces. It will be noted that in the aforesaid earlier application the one side only of the test piece was subjected to spring pressure.

Another feature of the invention consists in the employment of a double-armed walking beam which is journalled in its central region on a supporting framework, is provided with a device for imparting to it oscillatory movement, and which has points spaced from the journal connected to the test piece by means of resilient cushions such as springs, while preferably other cushions or springs are inserted between the opposite side of the test piece and the framework of the machine, the central portion of the test piece being supported by the machine frame.

Further objects, advantages and features of the invention will become apparent from the embodiment of the invention illustrated in the attached drawings and described in the following.

In the drawings:

Figure 1 is an elevation of the machine partly in section, and of a bolster to be tested;

Figure 2 is a plan view of the test bolster, partly in section along line 2—2 of Figure 1;

Figure 3:
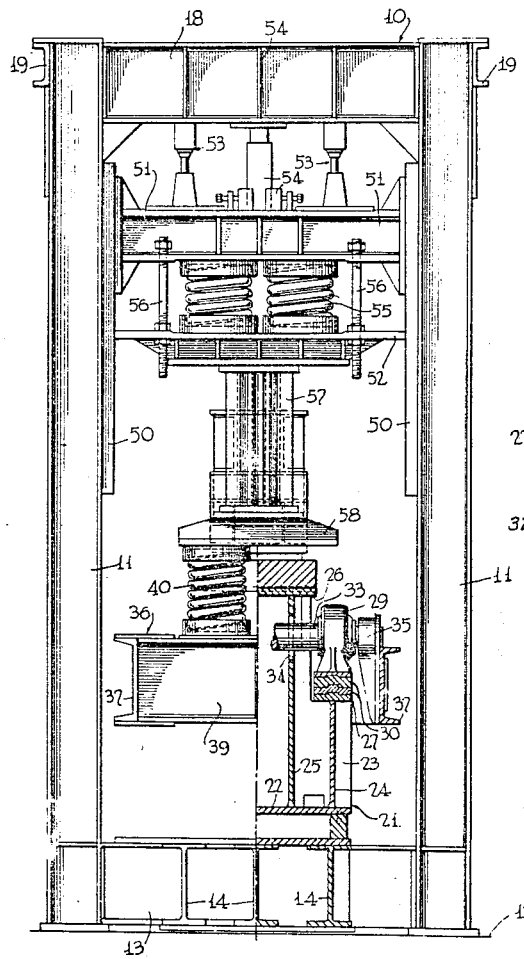
Figure 3 is a side elevation of the machine partly in section along line 3—3 of Figure 1.
Figure 4:
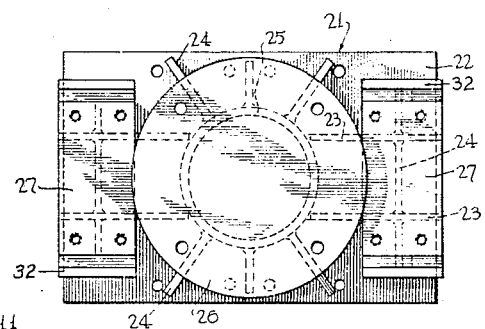
Figure 4 is a plan view of the supporting structure for the test piece and for the walking beam.
Figure 5:
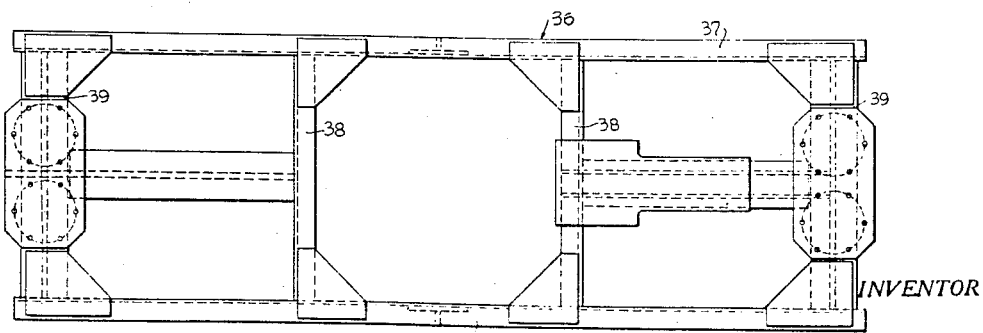
Figure 5 is a plan view of the walking beam.

In the drawings, 10 is a rigid frame structure which comprises four upright standards 11 arranged at the four corners of an elongated rectangle. The standards 11 rest securely on and are fastened to the ground 12. Each two of the standards are interconnected near the ground by heavy transverse girders 13 extending along the short sides of the rectangle. The middle portions of the girders 13 are interconnected by three heavy longitudinal beams 14. The central portions of the girders 14 are reinforced and interconnected by webs 15 and reinforcing plates 16, 17. The upper ends of the standards 11 are interconnected by heavy transverse girders 18 and longitudinal girders 19. The latter are interconnected in the central region by a cross member 20. The rigidity of this frame is additionally increased by corner brackets and plates wherever required.

The plate 17 supports an upright structure 21 which may consist of welded together steel plates 22, 23, 24, 25, 26 and 27. The horizontal plates 27 are arranged on the sides of the structure 21 at a lower level than the plate 26. The plate 26 serves for the support of the test specimen 28, whereas the lateral plates 27 serve each for the support of a bearing 29 by means of pairs of adjustable wedges 30. The height of the bearings is adjustable by the wedges 30 and screws 31 which later pass through screw-threaded holes in the webs 32 forming a rigid part of the structure 21.

Supported in the bearings 29 is a transverse shaft or axle 33 which extends through openings 34 in the webs 25 supporting the plate 26 above the shaft 33. The ends of the shaft 33 are connected by means of brackets 35 to a so-called walking beam 36. This beam consists mainly of two longitudinal girders 37 and transverse connecting intermediate and end members 38 and 39. The distance between the girders 21 is such that one of them passes on each side of the structure 21 but that both pass between the standards 11.

The transverse end reinforcements 39 are adapted for the support of the lower ends of springs or spring nests 40, the function of which will be explained later on.

Supported by the beam 36, on one side of the shaft 33 is a vibrator 41 which may be of conventional construction. This vibrator comprises an electric motor 42 and a gear 43. The driven shaft 44 of the gear carries an arm 45. Adjustable along this arm 45 is a weight 46. Provisions (not shown) are made for changing the speed of the motor. Also the gear may be of the type permitting change of the speed of the shaft 44. The weight of the vibrator 41 is balanced by a counterweight 43' arranged on the opposite side of the shaft 33.

On account of the eccentric location of the weight 46, its rotation will evidently impart vibrations to the gear 43 and the walking beam 36 supporting it. It is furthermore evident that the nature of the vibrations can be varied by changing the speed of the shaft 44, the distance of the weight 46 from the shaft 44 or by varying the mass of the eccentric weight 46.

The beams 14 of the framework carry underneath the gear 41 a hydraulic damping dash-pot 47, the plunger of which is connected by rod 48 and link 49 to the beam 36. The damping functions of this dash-pot are likewise adjustable for a purpose which will be explained later on.

Attached to the upper parts of the standards 11 are vertical rails 50 guiding the ends of transverse beams 51 and 52. The beam 51 is arranged underneath the upper transverse beam 18 interconnecting the standards 11, and it is adjustably supported thereby by means of screw jacks 53 and a clamping device 54. Springs 55 are arranged between the upper beams 51 and the lower beams 52. Bolts and nuts 56 arranged on the sides of the springs 55 and passing through the beams 51 and 52 serve for holding the latter together when the beam 52 does not rest on a test piece 28.

The test specimen 28, which in the illustrated embodiment constitutes a rail car body bolster, has its ends rigidly connected such as by welding to vertical members 57 which are inserted between the aforesaid movable member 52 and a second movable member 58 which latter rests on top of the before-described springs 40. The members 57 are formed and attached so as to transmit the stresses in similar fashion as they would be transferred from the adjacent body structure in actual use.

The operation of the new machine is as follows: After having figured out the load to which the specimen shall be subjected, springs 40 and 55 of required characteristics are selected and placed in the machine. The upper member 51 is held in raised position by the clamping device 54 and the lower member 52 is held to the member 51 with the springs 55 between them by the bolts and nuts 56. The length and the location with respect to the specimen 28, of the members 57 is determined and the members are attached to the specimen. Thereupon the test specimen is placed on the member 58 while the beams 51 and 52 with the springs 55 are still held in raised position. At this stage the specimen 28 will not rest on the central structure 21 but will be held thereabove by the springs 40. Now the devices 54 are released and the beams 51 and 52 with the springs 55 between them are moved downwardly. After the member 52 has made contact with the members 57 of the specimen 28, pressure is exerted by means of the jacks 53 until the specimen 28 rests on the central structure 21. The pressure may be further increased so as to exert a desired preload on the specimen 28. The pressure exerted from above by the springs 55 is much greater than that of the springs 40 and it is taken up partly by the central structure 21 and partly by the lower springs 40. The walking beam 36 is held in balance during this operation because ordinarily the springs on both sides have the same strength and the jacks 53 will be moved downwardly by the same amount on both ends of the machine.

Before, during or after the placing of the springs and of the test piece, the walking beam may be adjusted by means of the wedges 30 and screws 31.

The speed of the shaft 44, the mass and eccentricity of the weight 46 and the dampening effect of dashpot 47 are determined and correspondingly adjusted or selected.

After these preparations, the vibrator 41 is set in motion and thereby vibratory movement is imparted to the walking beam 36. The walking beam begins to oscillate about the axis of the shaft 33 and alternately increases and decreases the compression of the springs 40. The action of the springs is transmitted to the ends of the specimen 28. A compression of the springs 40 on the one end of the specimen 28 decreases the pressure exerted by the springs 55 on the same end, whereas on the other end the pressure of the springs 40 is decreased and thereby the action of the springs 55 on the specimen 28 increased.

The aforesaid action tends to flex the ends of the bolster 28 alternately up and down. The bolster rests firmly on the central structure 21 which has considerable width. The supporting area on the structure 21 is about equal to the area on which the bolster in an actual car would be supported on a truck.

The amplitude and speed of the vibrations are governed by the selection of the characteristics of the springs, by the speed, magnitude and eccentricity of the weight 46 and in these respects, the situation is similar to the conditions outlined at greater length in the copending application above referred to.

On account of the fact that the test specimen merely rests on top of the structure 21, a shifting of the supporting center from one side of the supporting structure to the other will take place each time the compression of the springs is shifted by the oscillation of the walking beam. Also in the actual use of the vehicle bolster such shifting occurs.

After having subjected a specimen to the vibratory action for a sufficient length of time, the specimen will begin to break down and the location of the break or breaks will indicate the location of the weak spots of the construction.

The machine may be provided with such accessories as an indicator for the amplitude as it is shown in the aforesaid earlier application or with means for permanently recording the movements of the walking beam, the springs or of the test specimen.

It might be said that the springs 40 on different ends of the walking beam efficiently perform together the functions of the two springs disclosed in the earlier application. Yet, the addition of the upper springs has no counterpart in the earlier application.

The new machine is liable to many modifications so as to adapt it to different specific requirements. Its principle might, for instance, be combined with the principle described in the earlier application by adding an additional spring acting on the top of the specimen in the arrangement of the earlier application. All such and other modifications and adaptations which will occur to those skilled in the art, are intended to be covered by the appended claims.

What is claimed is:

1. Endurance testing machine comprising a rigid supporting structure, a central support for a test specimen, a walking beam supported by said structure and journalled thereto about a horizontal axis, resilient means such as springs arranged on said walking beam on either side of said axis and adapted to engage a test specimen from one of its sides, two further resilient means such as springs resting against said frame structure and adapted to engage the opposite side of a test specimen, means for forcing said resilient means toward each other and against said two sides of a test specimen and thereby the test specimen against the central support, and means for imparting oscillatory movement about said axis to said walking beam.

2. Fatigue testing machine comprising vibrating means, a machine frame including a supporting structure for the central portion of a test beam, two sets of cushioning means arranged on different sides of said supporting structure in the direction of the test beam and each comprising an upper cushion and a lower cushion, each set having one of said cushions supported by the machine frame and adapted for engaging one side of the test beam in a region remote from said supporting structure and the other cushion adapted for engaging the opposite side of a test beam in the same region and connected to said vibrating means, whereby vibratory impulses are imparted to said other cushion and thence to the test beam.

3. In an endurance or fatigue testing method, supporting a test specimen substantially rigidly and stationarily in one section of its length, engaging said specimen by two cushioning or resilient means such as springs from opposite sides in a section of its length remote from said supporting section, holding said resilient means under pressure against the specimen, alternately increasing and decreasing the pressure exerted by at least one of said resilient means and thereby subjecting the specimen to alternating bending actions.

4. In an endurance or fatigue testing machine, a machine frame provided with means for holding a test specimen stationarily with respect to the machine frame, two resilient means such as springs arranged for engaging opposite sides of a test specimen in a region spaced from said holding means, means for pressing said resilient means against said sides of the test specimen, and means for alternating in quick succession the pressure exerted by at least one of said resilient means.

5. In a fatigue or endurance testing method, holding a test specimen stationarily in one section of its length by a supporting structure, engaging opposite sides of the specimen by two resilient means in a section remote from said first named section, in selecting the strength of one of said resilient means and the pressure exerted by it on the specimen so that it is greater than those of the other resilient means, taking up the excess pressure by the specimen and its attachment to the supporting structure, imparting vibratory movement to the weaker one of said resilient means thereby alternately decreasing and increasing the bending force exerted by the stronger resilient means on the specimen.

6. In a fatigue or endurance testing machine, a frame structure comprising two spaced standards interconnected by a cross member, a movable cross member inserted between and slidably guided on said standards, resilient means having one end resting against said movable cross member and having their other end adapted for engaging one side of a test specimen, a second resilient means arranged for engaging the opposite side of a specimen, means for imparting vibratory movement to said second resilient means, jacking means between said two cross members for pressing said first resilient means against a test specimen and the latter against said second resilient means.

7. In a machine according to claim 6, means in addition to said jacking means for releasably suspending said movable cross member on the frame structure when it is not supported by the resilient means and a test specimen.

8. In a machine according to claim 6, a further movable cross member arranged under the first named movable member, and means such as bolts and nuts for holding said two movable members together against the pressure of the spring between them when the pressure is not taken up by a test specimen.

9. In a testing machine, a framework comprising four standards arranged at the corners of an elongated rectangle, beams interconnecting the lower ends of the standards, an upstanding supporting structure arranged on said beams in the middle of the rectangle, a walking beam supported by said structure movably about an axis extending horizontally and parallel to the short sides of the rectangle, said walking beam extending between the standards on the short sides of the rectangle, means on said structure for supporting a test beam above and generally parallel to said walking beam, springs supported by the ends of the walking beam and adapted to engage the under side of the ends of a test beam, further springs adapted to engage the upper side of the ends of a test beam resting against cross members between the upper ends of said standards by means of adjustable jacking means, and means for imparting vibratory impulses to said walking beam.

10. Endurance testing machine comprising a rigid supporting structure, a central support for a test specimen, a walking beam supported by said structure and journalled thereto about a horizontal axis, resilient means such as springs arranged on said walking beam on either side of said axis and adapted to engage a test specimen from one of its sides, means for forcing said resilient means against said test specimen, means for holding the test specimen against the central support, and means for imparting oscillatory movement about said axis to said walking beam.

11. Endurance testing machine comprising a rigid supporting structure, a central support for a test specimen, a walking beam supported by said structure and journalled thereto about an axis, resilient means such as springs arranged on said walking beam on either side of said axis and adapted to act on a test specimen in one direction, two further resilient means such as springs reacting against said frame structure and adapted to act in opposite direction on a test specimen, means for forcing said resilient means so that they stress each other and exert pressure on the test specimen in said two directions and furthermore force the test specimen against the central support, and means for imparting oscillatory movement about said axis to said walking beam.

12. Fatigue testing machine comprising vibrating means, a machine frame including a supporting structure for the central portion of a test beam, two sets of cushioning or resilient means arranged on different sides of said supporting structure in the direction of the test beam, each set comprising two separate resilient means one of which is supported by the machine frame and adapted for acting in one direction on the test beam in a region remote from said supporting structure and the other is adapted for acting in the opposite direction on the test beam in the same general region, said last named resilient means being connected to said vibrating means whereby vibratory impulses are imparted to said last named resilient means and thence to the test beam.

13. In an endurance or fatigue testing machine, a machine frame provided with means for stationarily holding a test specimen with respect to the machine frame, two resilient means such as springs arranged for acting in opposite directions on a test specimen in a region spaced from said holding means, means for pre-stressing said resilient means and thereby a test specimen, and means for alternating in quick succession the stresses exerted by at least one of said resilient means.

RUPEN EKSERGIAN.